United States Patent Office 3,357,523
Patented Dec. 12, 1967

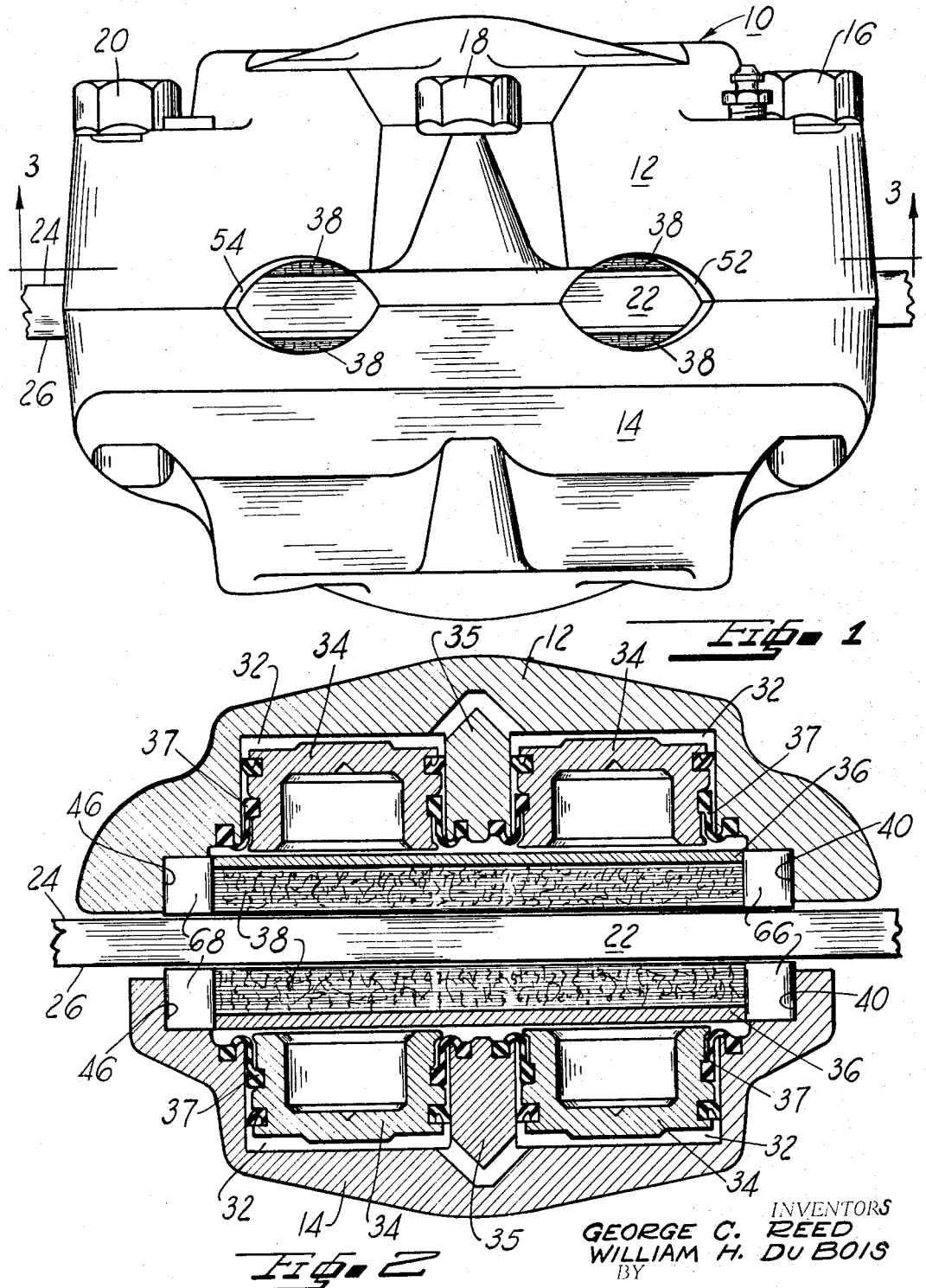

3,357,523
RESTRAINT SYSTEM FOR DISC BRAKE NOISE REDUCTION
George C. Reed, Fern Creek, Ky., and William H. Du Bois, South Bend, Ind., assignors to The Bendix Corporation, a corporation of Delaware
Filed Jan. 24, 1966, Ser. No. 522,457
1 Claim. (Cl. 188—73)

ABSTRACT OF THE DISCLOSURE

The following relates to a restraining mechanism for use in a caliper type disc brake which restrains movement of the brake shoes with respect to and in the plane of the brake disc to limit the vibrational freedom of the brake shoes and thereby reduce or eliminate undesirable noises. The mechanism includes resilient restraining elements connected to the caliper housing and the brake shoes for accomplishing this end.

---

This invention relates to disc brakes and, more particularly, to improvements in a caliper type disc brake.

In caliper type disc brakes utilizing high friction level lining and/or friction pair materials, the noise levels are oftentimes objectionable. This is particularly true when such brakes are utilized in passenger cars. One type of noise which has been noted in connection with the use of cermet friction materials is a low frequency "grating" sound. Data obtained from accelerometers mounted at various points on caliper type disc brakes indicated that such grating sounds or noises were generally in the 100–200 c.p.s. frequency range and involved vibrations of the lining segments in the plane of the brake disc exclusively.

Accordingly, it is an object of this invention to provide means for reducing or eliminating undesirable types of noises associated with a caliper type disc brake.

Another object of this invention is to provide a restraining mechanism which limits the vibrational freedom of the lining segments in the plane of the brake disc, to thereby reduce or eliminate undesirable grating noises.

More particularly, it is an object of this invention to provide a disc brake wherein the restraining mechanism comprises spring pins which are connected to the caliper housing and the friction lining.

The above and other objects and features of this invention will become apparent from the following description taken in connection with the accompanying drawings which form a part of this disclosure and in which:

FIGURE 1 is a plan view of a caliper type disc brake assembly;

FIGURE 2 is a sectional view of the brake assembly shown in FIGURE 1;

Figure 3:
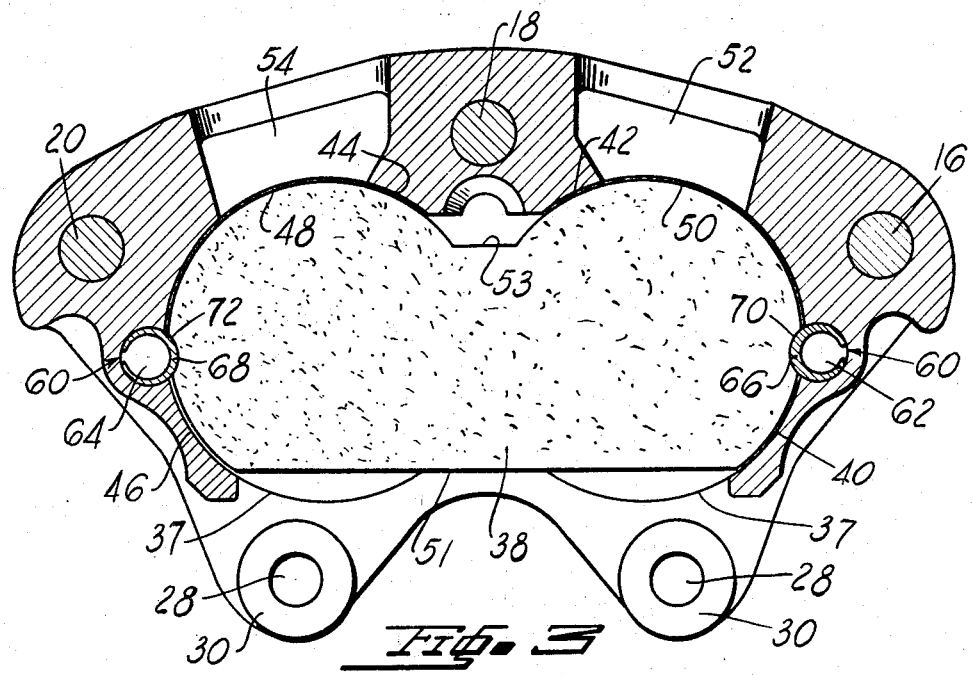
FIGURE 3 is a sectional view taken along line 3—3 of FIGURE 2, illustrating the invention in connection with a brake shoe and cylinder housing arrangement.

Referring to FIGURE 1 of the drawings, it will be seen that numeral 10 indicates a housing formed of two castings 12 and 14 which are secured together by bolts 16, 18, and 20. A rotor or disc 22, which is straddled by the housing, includes oppositely disposed friction surfaces 24 and 26 thereon. The housing 10 is secured to a stationary part of a vehicle, such as an axle flange, by a pair of bolts (not shown) extending through openings 28 in a pair of lugs 30 which extend radially inwardly from the casting 12 (see FIGURE 3). Each casting has a pair of fluid chambers 32 located therein, each of which contains a piston 34. A wall 35 separates the fluid chambers from each other. A rubber boot 37 is provided for each piston to prevent contaminants from entering the fluid chambers.

Two brake shoes, each comprising a backing plate 36 and friction lining 38, are interposed between the pistons 34 and the disc 22 so that one of the shoes is on one side of the disc and the other of the shoes is on the other side of the disc. Since the arrangement of the brake shoes with respect to the anchoring surfaces on each casting and the invention is the same, the following description with reference to casting 12 and its related brake shoe will also apply to the casting 14 and its related brake shoe. The casting 12 has four axially extending circumferentially spaced arcuate surfaces 40, 42, 44, and 46 for guiding and anchoring of the brake shoe. The surface 42 is of the same radius and on the same center as the surface 40 and the surface 44 is of the same radius and on the same center as the surface 46. The surfaces 40 and 42 and the surfaces 44 and 46 are concentric with the wall of their respective fluid chambers 32.

The backing plate 36 of the brake shoe, which spans both pistons, is symmetrical and has two arcuate portions 48 and 50 of a given radius. The arcuate portions 48 and 50 are connected at one end by a chordally extending radial inner edge 51 and at the other end by a straight edge portion 53 located on the radial outer edge of the backing plate 36. The centers of the arcuate portions 48 and 50 are spaced the same distance apart as the centers of the chambers 32. As shown in FIGURE 3, a clearance is provided between the edge of the backing plate and the anchoring surfaces 40, 42, 44, and 46 to allow for heat expansion during brake operation. This clearance is exaggerated for illustration purposes and in reality is in the vicinity of .012 inch across the diameter. An opening 52 is provided in the casting between the guiding and anchoring surfaces 40 and 42 and an opening 54 is provided in the casting between the anchoring surfaces 44 and 46. These openings provide for inspection of the lining and for escape of dust and heat.

It will be obvious from the foregoing description that, during operation of the brake, rotation of the disc 22 in a clockwise direction will cause the brake shoe to shift in a circumferential direction to the right with the edge 50 of the backing plate bearing on an area of the anchoring surface 40 and will cause the left hand side of the brake shoe to move radially outwardly in a clockwise direction until the edge 48 of the backing plate 36 bears on the anchoring surface 44. Operation of the brake during counterclockwise rotation of the disc will cause the edge 48 of the backing plate to bear on an area of the anchoring surface 46 and the edge 50 of the backing plate 36 to bear on the anchoring surface 42. Therefore, depending upon rotation of the rotor during braking, the anchoring load will be divided between the anchoring surfaces 40 and 44 or the anchoring surfaces 46 and 42.

In order to substantially reduce or eliminate certain types of noises associated with caliper type disc brakes, a resilient restraining mechanism, indicated generally by the numeral 60 is operatively connected to the housing and the brake shoe for limiting vibrational freedom of the brake shoe or friction lining in the plane of the disc. More specifically, holes or cavities 62 and 64 are drilled into the caliper casting so as to break out into the lining cavity. Spring pins 66 and 68 of appropriate size are inserted into these holes, as shown in FIGURE 3. The friction lining segment is notched or recessed on each end at 70 and 72, respectively, for receiving a portion of the spring pins. The notches are formed so as to have essentially the same radius as the adjacent, exposed portions of the spring pins. When the pins are located, as shown, so that the notches fit around the exposed portions of the spring pins, the brake shoes or friction linings will be restrained in the plane of the brake disc, but will be free to move perpendicular to the disc as brake pressure is applied or released. The holes, pins, and notches are located so as to provide minimum practical clearance. The radial and circumferential vibrational freedom of the lining segments is thus quite limited and the spring pins provide an additional damping to further reduce such noise producing vibrations.

Figure 4:
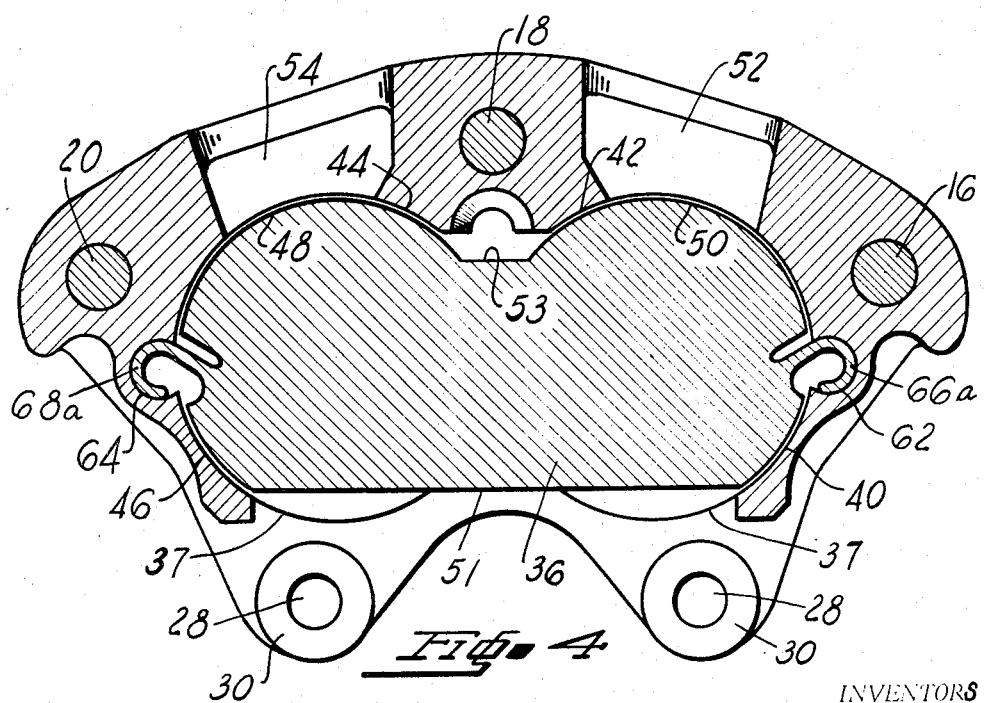
FIGURE 4 is a sectional view, similar to that of FIGURE 3, showing another embodiment of the invention.

In FIGURE 4, which shows another embodiment of the invention, like parts are designated by like numerals. In this embodiment, resilient looped ears 66a and 68a, which are a part of the lining segments, extend therefrom and fit into the breakout-holes 62 and 64, respectively. These looped-ear type projections act to dampen lining vibrations in the plane of the brake disc by means of their elactic properties as well as by the restraint imposed by their close fit in the holes. The linings will be free to move perpendicular to the disc face as brake pressure is applied or released, in essentially the same manner as in the FIGURE 3 embodiment.

Those acquainted with this art will readily understand that the invention herein set forth is not necessarily limited and restricted to the precise and exact details presented and that various changes and modifications may be resorted to without departing from the spirit of the invention. Accordingly, we do not desire to be limited to the specific details described herein, primarily for purposes of illustration, but instead desire protection falling within the scope of the appended claim.

Having thus described the various features of the invention, what we claim as new and desire to secure by Letters Patent is:

A disc brake comprising a rotatable disc having friction surface means thereon, a member extending opposite said friction surface means, said member having first arcuate anchoring surface means formed thereon, a friction element slidably carried by said member and located opposite said disc for frictional engagement with said friction surface means, said friction element having second arcuate anchoring surface means coacting with said first arcuate anchoring surface means, said first anchoring surface means comprising a first pair of circumferentially-spaced anchoring surfaces, and said second anchoring surface means comprising a second pair of circumferentially-spaced anchoring surfaces adjacent said first pair of anchoring surfaces for respective engagement therewith, piston means slidably carried by said member and located adjacent said friction element for causing engagement of said friction element with said disc, said friction element being movable relative to said piston means in the plane of said disc, and resilient means operatively connected to said first and second anchoring surface means of said member and friction element, respectively, for restraining and limiting vibrational freedom of said friction element in the plane of said disc, said resilient means including first spring means operatively connected to one set of coacting surfaces of said first and second anchoring surface means and second spring means operatively connected to the other set of coacting surfaces of said second anchoring surface means, said member including a first cavity for containing a portion of said first spring means and a second cavity for containing a portion of said second spring means, said first and second spring means being an integral part of said friction element and extending into said first and second cavities, respectively.

References Cited

UNITED STATES PATENTS

| | | | |
|---|---|---|---|
| 3,255,848 | 6/1966 | Harrison | 188—73 |
| 3,261,429 | 7/1966 | Burnett et al. | 188—73 |
| 3,285,371 | 11/1966 | Cadiou | 188—73 |

FOREIGN PATENTS

| | | |
|---|---|---|
| 1,330,418 | 5/1963 | France. |
| 1,345,151 | 10/1963 | France. |
| 707,013 | 4/1954 | Great Britain. |

MILTON BUCHLER, *Primary Examiner.*

G. E. HALVOSA, *Assistant Examiner.*